United States Patent
Kim

(10) Patent No.: US 9,448,620 B2
(45) Date of Patent: Sep. 20, 2016

(54) INPUT METHOD AND APPARATUS OF PORTABLE DEVICE FOR MAPPING SEGMENTS OF A HAND TO A PLURALITY OF KEYS

(71) Applicant: Samsung Electronics Co., Ltd., Gyeonggi-do (KR)

(72) Inventor: Jeonghun Kim, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 185 days.

(21) Appl. No.: 13/971,972

(22) Filed: Aug. 21, 2013

(65) Prior Publication Data

US 2014/0055343 A1 Feb. 27, 2014

(30) Foreign Application Priority Data

Aug. 21, 2012 (KR) ........................ 10-2012-0091023

(51) Int. Cl.
*G06F 3/00* (2006.01)
*H04M 1/725* (2006.01)
*G06F 3/03* (2006.01)
(Continued)

(52) U.S. Cl.
CPC ............... *G06F 3/005* (2013.01); *G06F 3/017* (2013.01); *G06F 3/0304* (2013.01); *H04M 1/72519* (2013.01); *G02B 27/017* (2013.01); *H04M 2250/52* (2013.01); *H04M 2250/70* (2013.01)

(58) Field of Classification Search
CPC ........ G06F 3/005; G06F 3/011; G06F 3/017; G06F 3/0304; G06F 1/1673; H04M 1/72519; H04M 2250/52; H04M 2250/70; G02B 27/017; G02B 2027/0138; G02B 2027/014
See application file for complete search history.

(56) References Cited

U.S. PATENT DOCUMENTS

| | | | |
|---|---|---|---|
| 6,771,294 B1 | 8/2004 | Pulli et al. | |
| 7,770,136 B2 * | 8/2010 | Beeck | G06F 3/017 715/863 |
| 8,228,315 B1 * | 7/2012 | Starner et al. | 345/175 |

(Continued)

FOREIGN PATENT DOCUMENTS

| | | |
|---|---|---|
| KR | 10-2011-0107542 A | 10/2011 |
| KR | 10-2012-0028743 A | 3/2012 |
| WO | 2008/047172 A2 | 4/2008 |

OTHER PUBLICATIONS

Lehikoinen et al.; "N-fingers: a finger-based interaction technique for wearable computers"; Feb. 12, 2001; Interacting with Computers 13 (2001) 601-625; Elsevier.

(Continued)

*Primary Examiner* — Keith Crawley
(74) *Attorney, Agent, or Firm* — Cha & Reiter, LLC.

(57) ABSTRACT

An input apparatus for use in a portable device is provided. The input apparatus includes a camera for capturing an image; a storage unit which stores a key-hand mapping table for mapping segments of a hand to a plurality of keys, respectively, according to predetermined criteria; a display unit displaying the captured image during an input mode; and a control unit which activates the camera in the input mode, controls the display unit to display the captured image, assign the plural keys to the segments of the hand based on mapping information of the key-hand mapping table, detect an image change in one of the segments displayed on the display unit, and input the key mapped to the segment at which the image change is detected on the display unit.

24 Claims, 10 Drawing Sheets

(51) Int. Cl.
*G06F 3/01* (2006.01)
*G02B 27/01* (2006.01)

(56) References Cited

U.S. PATENT DOCUMENTS

| | | |
|---|---|---|
| 2006/0044265 A1* | 3/2006 | Min .............................. 345/156 |
| 2008/0089587 A1 | 4/2008 | Kim et al. |
| 2008/0244465 A1 | 10/2008 | Kongqiao et al. |
| 2009/0295738 A1 | 12/2009 | Chiang |
| 2010/0199232 A1* | 8/2010 | Mistry et al. ................. 715/863 |
| 2010/0302165 A1 | 12/2010 | Li |
| 2011/0216075 A1* | 9/2011 | Shigeta ................... G06F 3/017 345/473 |
| 2012/0062558 A1 | 3/2012 | Lee et al. |
| 2013/0113709 A1* | 5/2013 | Wine ............................ 345/169 |
| 2013/0336528 A1* | 12/2013 | Itani ..................... G06T 7/0085 382/103 |

OTHER PUBLICATIONS

Gustafson et al.; "Imaginary Phone: Learning Imaginary Interfaces by Transferring Spatial Memory from a Familiar Device"; Oct. 2011; UIST'11.

Sasaki et al.; "Hand-Menu System: A Deviceless Virtual Input Interface for Wearable Computers"; 2006; pp. 44-53; vol. 8; CEAI.

Terajima et al.; "Fast Finger Tracking System for In-air Typing Interface"; 2009; CHI 2009 Spotlight on Works in Progress; Boston, MA, USA.

Pratt; "Thumbcode: A Device-Independent Digital Sign Language"; 1998; Stanford University.

Goldstein et al.; "The Finger-Joint Gesture Wearable Keypad"; 1999; Ericsson Radio Systems.

* cited by examiner

INPUT METHOD AND APPARATUS OF PORTABLE DEVICE FOR MAPPING SEGMENTS OF A HAND TO A PLURALITY OF KEYS

CLAIM OF PRIORITY

This application claims the benefit under 35 U.S.C. §119 (a) of a Korean patent application filed on Aug. 21, 2012 in the Korean Intellectual Property Office and assigned Serial No. 10-2012-0091023, the entire disclosure of which is hereby incorporated by reference.

BACKGROUND

1. Field of the Invention

The present disclosure relates to an input apparatus and method for providing a camera-assisted input operation for use in a portable device.

2. Description of the Related Art

A portable device is equipped with at least one input means for receiving a user command. To this end, the portable device may be equipped with at least one of touch keypad, touchscreen, laser or beam projector-based virtual keyboard, speech recognition input means, etc.

However, the above conventional input devices have certain drawbacks. For example, the input devices such as touchscreen, virtual keyboard, and button keypad require large mounting areas, and also the virtual keyboard is too expensive to be implemented, and the speech recognition rate in the speech recognition-based input device contain many errors during operation.

Recently, there is much interest in the wearable computers such as glasses-type terminal and wristwatch-type terminal. Such wearable computers are even more limited in space for mounting an input means such as button type keypad and touchscreen. As such, the speech recognition-based input means is suitable for the wearable computer. However, the speech recognition-based input device performs poorly in a noisy environment.

Accordingly, there are many interests in new input devices and schemes to overcome the above deficiency. Although the speech recognition-based input devices are becoming popular, the low recognition accuracy and noisy environment vulnerability discussed earlier are the main obstacles to adopt the speech recognition technology. The speech recognition-based input means also has another drawback in that the privacy is issue as others can eavesdrop.

Accordingly, there is need for a novel input technology applicable to the wearable computer or electronic devices that can overcome the drawbacks associated with the above conventional input means.

SUMMARY

The present invention has been made in an effort to solve the above problem and provides additional advantages, by providing an input apparatus and method for a portable device that is capable of providing an input by incorporating a camera technology in a new way.

In accordance with an aspect of the present invention, an input apparatus for use in a portable device includes a camera for capturing an image; a storage unit which stores a key-hand mapping table for mapping segments of a hand to a plurality of keys, respectively, according to predetermined criteria; a display unit which displays, in an input mode, the captured image thereon; and a control unit which activates the camera during the input mode, controls the display unit to display the captured image, assign the plural keys to the segments of the hand based on mapping information of the key-hand mapping table, detect an image change in one of the segments displayed on the display unit, and input the key mapped to the segment at which the image change is detected on the display unit.

In accordance with another aspect of the present invention, an input method for use in a portable device includes: activating a camera during an input mode; displaying an image captured by the camera on a screen; determining whether a hand is recognized from the image; assigning a plurality of keys to segments of the hand based on predetermined criteria; detecting an image change in one of the segments; and inputting the key mapped to the segment at which the image change is detected.

In accordance with another aspect of the present invention, an input apparatus of a portable device includes: a camera for capturing an image; and a control unit which recognizes, in an input mode, segments of a hand from the captured image, mapping different keys to the segments according to predetermined criteria, detecting a movement of an input object over the captured image, and processes an input of a key mapped to the segment, the input of the key being activated in response to a change in the image at a particular segment of the hand pointed by the input object.

In accordance with still another aspect of the present invention, an input method of a portable device includes: capturing an image during an input mode; recognizing a hand and segments of the hand of the captured image; mapping keys to the segments according to predetermined criteria; and detecting an input of a key mapped to the segment via an input object, the input of the key being activated in response to a change in the image at a particular segment pointed by the input object.

DETAILED DESCRIPTION

Exemplary embodiments of the present invention are described with reference to the accompanying drawings in detail. The same reference numbers are used throughout the drawings to refer to the same or like parts. For the purposes of clarity and simplicity, detailed description of well-known functions and structures incorporated herein may be omitted to avoid obscuring the subject matter of the present invention.

The specification and drawings are to be regarded in an illustrative rather than a restrictive sense in order to help understand the present invention. It should be apparent to those skilled in the art that various modifications and changes can be made thereto without departing from the broader spirit and scope of the invention.

In the following description, the portable device according to an embodiment of the present invention may be any of glasses-type information terminal, duplex system, wearable computer or electronic device, cellular communication terminal, Personal Digital Assistants (PDA), smartphone, Tablet Personnel Computer (PC), hand-held PC, Portable Multimedia Player (PMP), etc.

Figure 1:
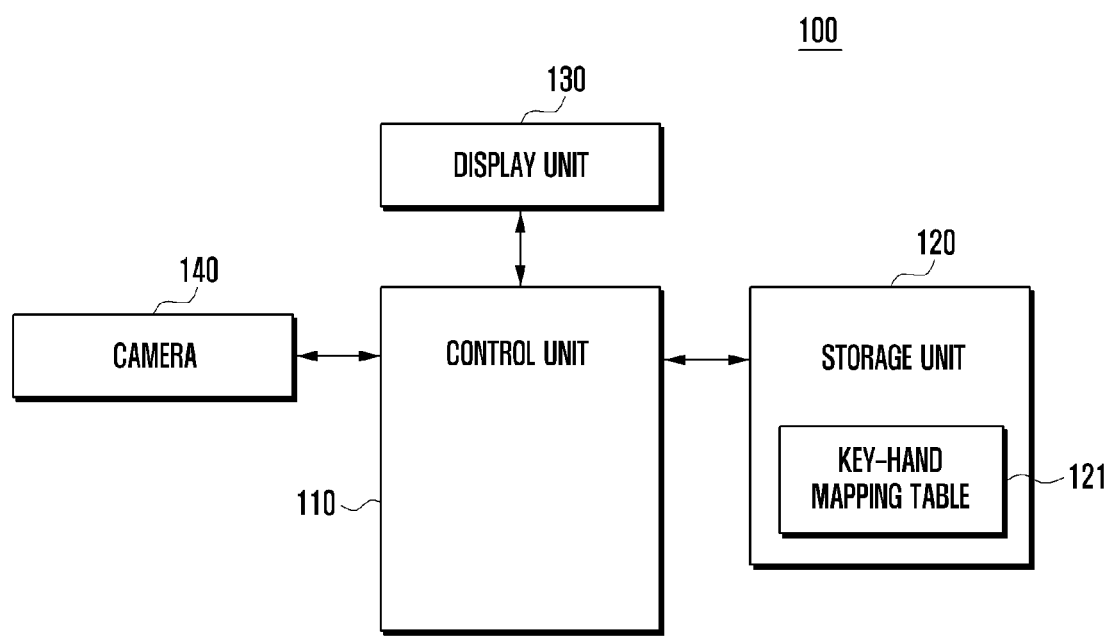
FIG. 1 is a block diagram illustrating the configuration of the portable device according to an embodiment of the present invention.
Figure 2:
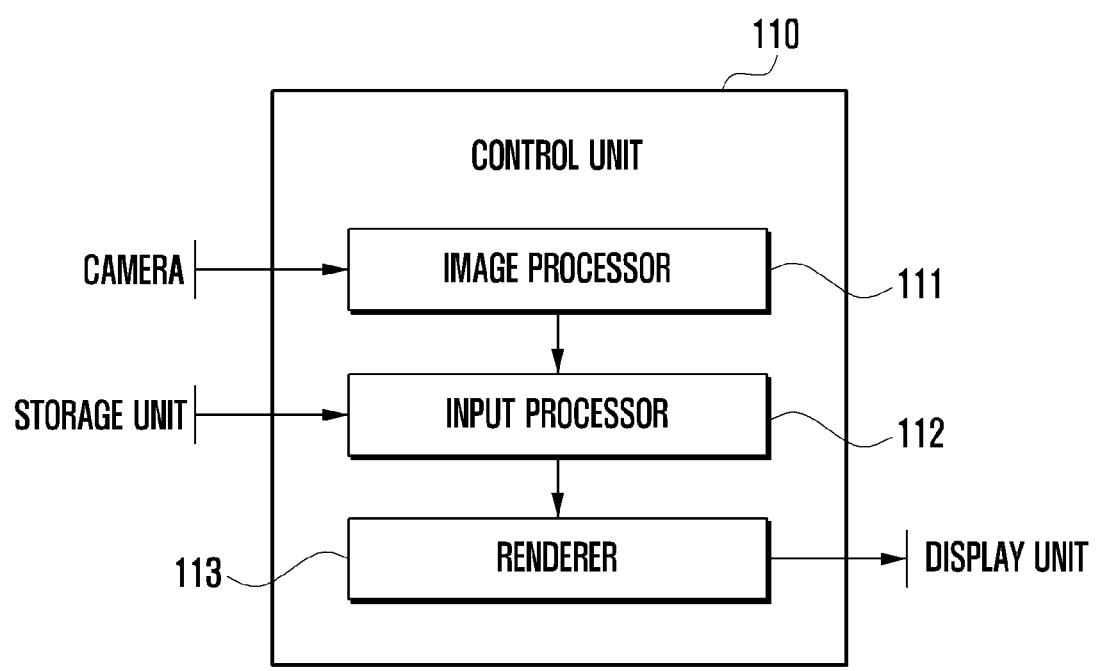
FIG. 2 is a block diagram illustrating the configuration of a control unit shown in FIG. 1.

FIG. 1 is a block diagram illustrating the configuration of the portable device according to an embodiment of the present invention, and FIG. 2 is a block diagram illustrating the configuration of the control unit of the portable device of FIG. 1.

Referring to FIGS. 1 and 2, the portable device 100 according to an embodiment of the present invention includes a camera 140, a display unit 130, a storage unit 120, and a control unit 110. The storage unit 120 may include a key-hand mapping table 121, and the control unit 110 may include an image processor 111, an input processor 112, and a renderer 113.

The camera 140 is a device for capturing an image and converting the image to an electric signal to store the captured image in digital format. The camera 140 can be implemented with a Charge Coupled Device (CCD) image sensor or a Complementary Metal Oxide Semiconductor (CMOS) image sensor. The camera 140 is capable of supporting still image shooting and motion image shooting functions. Particularly in an embodiment of the present invention, the camera 140 can be driven during a text input mode.

The display unit 130 displays various menus of the portable device 100 and information input by or to be presented to the user. That is, the display unit 130 is capable of providing various screens associated with the operations of the portable device 100 such as home screen, menu screen, text input screen, phonebook screen, webpage display screen, etc. Particularly in an embodiment of the present invention, the display unit 130 is capable of displaying various screen interfaces related to the text input by fingers under the control of the control unit 110. A detailed description on the screen interfaces are made later with reference to FIGS. 5 to 10.

The display unit 130 is capable of being implemented with one of Liquid Crystal Display (LCD) and Organic Light Emitting Diode (OLED). In the case that the display unit 130 is implemented in the form of a touchscreen, the display unit 130 includes a touch panel to operate as an input unit. In the case of the glasses-type terminal, the display unit 130 can be implemented as a transparent LCD device.

The storage unit 120 stores Operating System (OS) of the portable device 100, application programs related to the optional functions (such as audio playback function, still and motion picture playback function, and broadcast playback function), user and application data transmitted/received during a communication mode. For example, the storage unit 120 is capable of storing video files, game files, music files, movie files, etc. Particularly in an embodiment of the present invention, the storage unit 120 stores the key-hand mapping table 121. The key-hand mapping table 121 stores the mappings between hand segments (e.g. phalanges and/or finger joints) and specific keys (letters). The key-hand mapping table 121 may map the segments of at least one of the left and right hands to the corresponding keys. In detail, it is possible to map the four fingers (with the exception of the thumb) of at least one of the left and right hands to the corresponding keys. Here, the thumb is used as a means for selecting the key to input.

Each of the four fingers (with the exception of the thumb) consists of three phalanges. That is, in the case of mapping the phalanges of one of the left and right hands, 12 key mappings can be generated. In this case, the key-hand mapping table 121 can include the key mapping information similar to that of the 3*4 keypad dominant in the conventional portable device. In the case of mapping the phalanges of both the left and right hands, it is possible to secure 24 key mappings. In this case, the key-hand mapping table can include the key mapping information similar to that of the QWERTY keypad. It should be apparent to those in the art that the key mapping information of the key-hand mapping table 121 can be modified according to different criteria in accordance with the designer's preference.

The storage unit 120 is capable of storing a plurality of key-hand mapping tables for the respective types of character sets. For example, the storage unit 120 is capable of storing the key-hand mapping tables for the respective Korean character set, English character set, special character set, numeric character set, and other known character set.

The control unit 110 controls the overall operations of the portable device 100 and signal flows among the internal function blocks of the portable device 100 and processes the data. For example, the control unit 110 can be a Central Processing Unit (CPU) or an Application Processor (AP). Particularly in an embodiment of the present invention, the control unit 110 is capable of controlling character input using an object (hand) extracted from the image captured by the camera 140. In detail, the control unit 110 activates the camera 140 in the input mode and processes the hand image periodically to recognize the outline and boundary (line) positions of the hand.

Thereafter, the control unit 110 overlays or superimpose different keys (or characters) mapped to the respective phalange on a preview screen by referencing the key-hand mapping table 121 stored in the storage unit 120. More specifically, the control unit 110 is capable of displaying particular key map where different keys are mapped to the phalanges on the preview screen based the key mapping information from the key-hand mapping table 121 using the augmented reality (AR) technology. Using the known advanced AR technology (e.g. adding computer vision and object recognition) the keys mapped to the user's hand becomes interactive and digitally manipulable. As shown later, artificial information about the keys can be overlaid on the user's hand to simulate the activation of a key input. Further, the key map displayed on the preview screen can be changed depending on the number of hands and the shape of hand detected thereon. For example, a specific key map displayed on the preview screen can be determined depending on the following conditions: single hand input mode, both hand input mode, left hand input mode, right hand input mode, all fingers-unfolded state, and some fingers-folded state.

The control unit 110 is capable of recognizing the movement of a thumb (or an input object) and a change of color in the area where the thumb or the input object simulates the activation of an input key. The control unit 110 is capable of processing such recognition as a key (or character) input event. That is, the control unit 110 is capable of monitoring the movement of the thumb and detects for a change in the image (e.g. shadow, color, etc.) at an area where the thumb is activated by a pressing motion. The control unit 110 is also capable of tracing the movement of the thumb to determine a swipe input gesture by determining the movement of the thumb (e.g. change in the movement direction and speed).

The control unit 110 is also capable of changing the key map upon detection of a change in the hand shape or a specific gesture. For example, while the control unit 110 is displaying an English character key map in the state when all fingers are unfolded, upon detection of folding the ringer finger and little finger, for example, the English character key map can be changed to a numeric character map. As another example, assuming that there are three character key maps (English small character key map, English capital character key map, and Korean character key map), the control unit 110 can change the currently display English small character key map, when all unfolded fingers are opened, to the Korean character key map upon detection of a gesture of folding and then unfolding at least one finger. Alternatively, the three character key maps can be displayed cyclically whenever the finger fold and unfold gesture is detected. Therefore, different combination of hand gesture can be preprogrammed to display a desired key map on the screen.

In order to accomplish above operations, the control unit 110 includes an image processor 111, an input processor 112, and a renderer 113.

The image processor 111 performs the sampling of information such as outline, color, frequency, brightness, etc. of the video data (Raw data) captured by the camera 140 to generate user or controller-cognitive information in real time. For example, the image processor 111 extracts the same frame image at a period (1/24~1/5 second) and analyzes the extracted sample frame image to recognize the boundaries such as outline, palm lines, joints, finger tips, and finger nails. Such a real time image processing technology is well known to those skilled in the art of the present invention, thus omitted herein.

If the hand and finger joints are recognized by the image processor 111, the input processor 112 checks whether there is a key map matching the recognized hand shape and hand segments in the key-hand mapping table 121 of the storage unit 120. If the corresponding key map exists, the input processor 112 transfers the information on the corresponding key map to the renderer 113. If the key map information is received, the render 113 presents the characters, numbers or symbols mapped to the respective hand segments (e.g. phalanges, finger tips, joints, etc.), using the augmented reality technology. In order to accomplish this, the image processor 111 calculates the positions of the segments in real time and provides the position information to the renderer 113. The renderer 113 is capable of presenting the characters and/or keys mapped to the respective segments on the screen based on the calculated segment information.

The image processor 111 is capable of tracking the fingertip of the thumb (e.g. nail part). At this time, the renderer 113 is capable of highlighting the segment at which the thumb is positioned with distinct background color, character size, font, color, and/or special effect such as blinking to differentiate from other segments. That is, the renderer 113 highlights the segment closest to the thumb visually.

Afterward, the image processor 111 is capable of detecting the change in the image (e.g. shade, color, etc.) when the thumb presses or activates a specific segment. If any change is detected in the image by the image processor 111, the input processor 112 regards the change as an input event to enter the character, number or symbol mapped to the corresponding segment.

The image processor 111 is also capable of detecting a change in hand shape or gesture by processing the image in real time. If a change in the hand shape or hand gesture is detected, the input processor 112 retrieves the key map corresponding to the changed hand shape or gesture from the storage unit 120 and sends the information on the retrieved key map to the renderer 113. As a result, the renderer 113 is capable of changing the currently presented key map with the newly retrieved key map on the screen of the display unit 130.

Although not shown in FIG. 1, the portable device 100 is capable of further including selectively at least one of Global Positioning System (GPS) module, broadcast reception module, digital audio playback module such as MP3, Internet Access module for Internet access service, motion sensor for sensing the motion of the portable device 100, and their equivalents. Although it is difficult to enumerate all of the functional components that can be converged, the portable device 100 according to an embodiment of the present invention is capable of being implemented with or without at least one of the aforementioned components and their equivalent devices.

Figure 3:
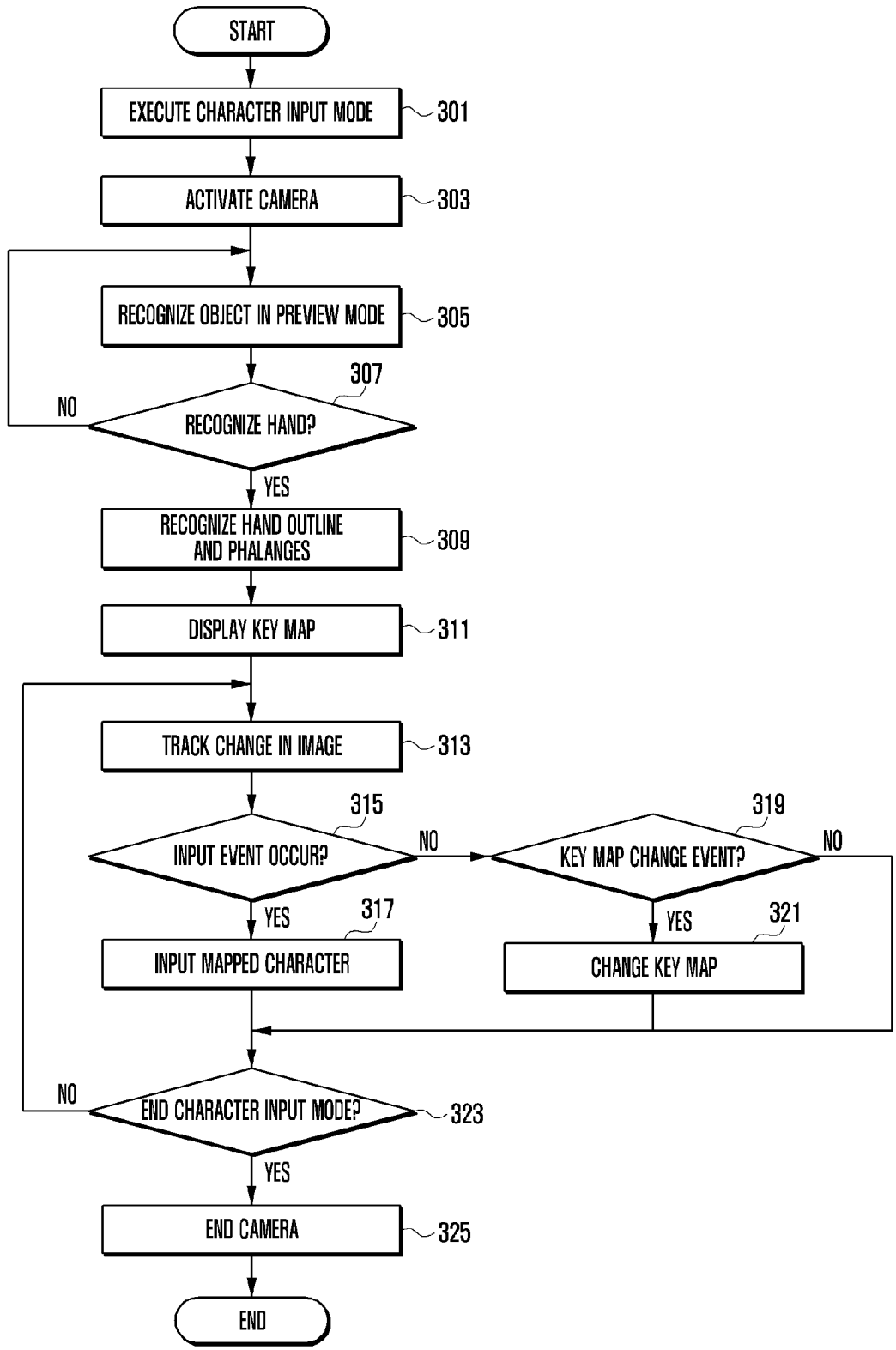
FIG. 3 is a flowchart illustrating the input method of the portable device according to an embodiment of the present invention.

FIG. 3 is a flowchart illustrating the input method of the portable device according to an embodiment of the present invention.

Referring to FIGS. 1 to 3, the control unit 110 of the portable device according to an embodiment of the present invention detects the execution of the character input mode at step 301. If the character input mode is executed, the control unit 110 activates the camera 140 at step 303.

After activating the camera 140, the control unit 110 recognizes the object on the preview screen at step 305 and determines whether the object is recognized as a hand at step 307. If the object is not recognized as a hand, the control unit 110 returns the procedure to step 305. If the object is recognized as a hand at step 307, the control unit 110 recognizes the hand outline and finger segments at step 309. Although not depicted in FIG. 3, the control unit 110 is capable of outputting an error message notifying that no hand is recognized before returning the procedure to step 305.

Next, the control unit 110 displays a key map at step 311. In detail, the control unit 110 retrieves the characters, numbers, or symbols mapped to the phalanges (or joints) from the storage unit 120 and presents the retrieved characters on the respective phalanges (or joints) using the augmented reality technology. Detailed description thereon is made later with reference to FIGS. 5 to 8.

The control unit 110 tracks the change in the image at step 313. For example, the control unit 110 is capable of detecting a change in the shade and color of the phalanges or joints due to the movement and press action of the thumb by a user. Detailed description thereon is made later with reference to FIG. 9.

The control unit 110 determines whether an input event is detected at step 315. The input event occurs with a specific change in the image. For example, if a change in shade is changed due to a press action of the thumb to a specific phalange, the control unit 110 detects this change as an input event.

If an input event is detected at step 315, the control unit 110 enters the character mapped to the segment where the input event is detected at step 317. Otherwise, if no input event is detected, the control unit 110 determines whether a key map change event is detected at step 319. The key map change event occurrence can be determined depending on the change in hand shape or specific gesture (upside-down hand gesture and clench-unclench hand gesture). Detailed description thereon is made later with reference to FIG. 10.

If no key map change event is detected, the procedure goes to step 323. If a key map change event is detected, the control unit 110 changes the key map at step 321. For example, the control unit 110 is capable of changing the Korean character key map to the English character key map or numeric key map.

Thereafter, the control unit 110 determines whether the character input mode is terminated at step 323. If the character input mode is not terminated, the control unit 110 returns the procedure to step 313. Otherwise, if the character input is terminated, the control unit 110 deactivates the camera 140 at step 325.

Figure 4:
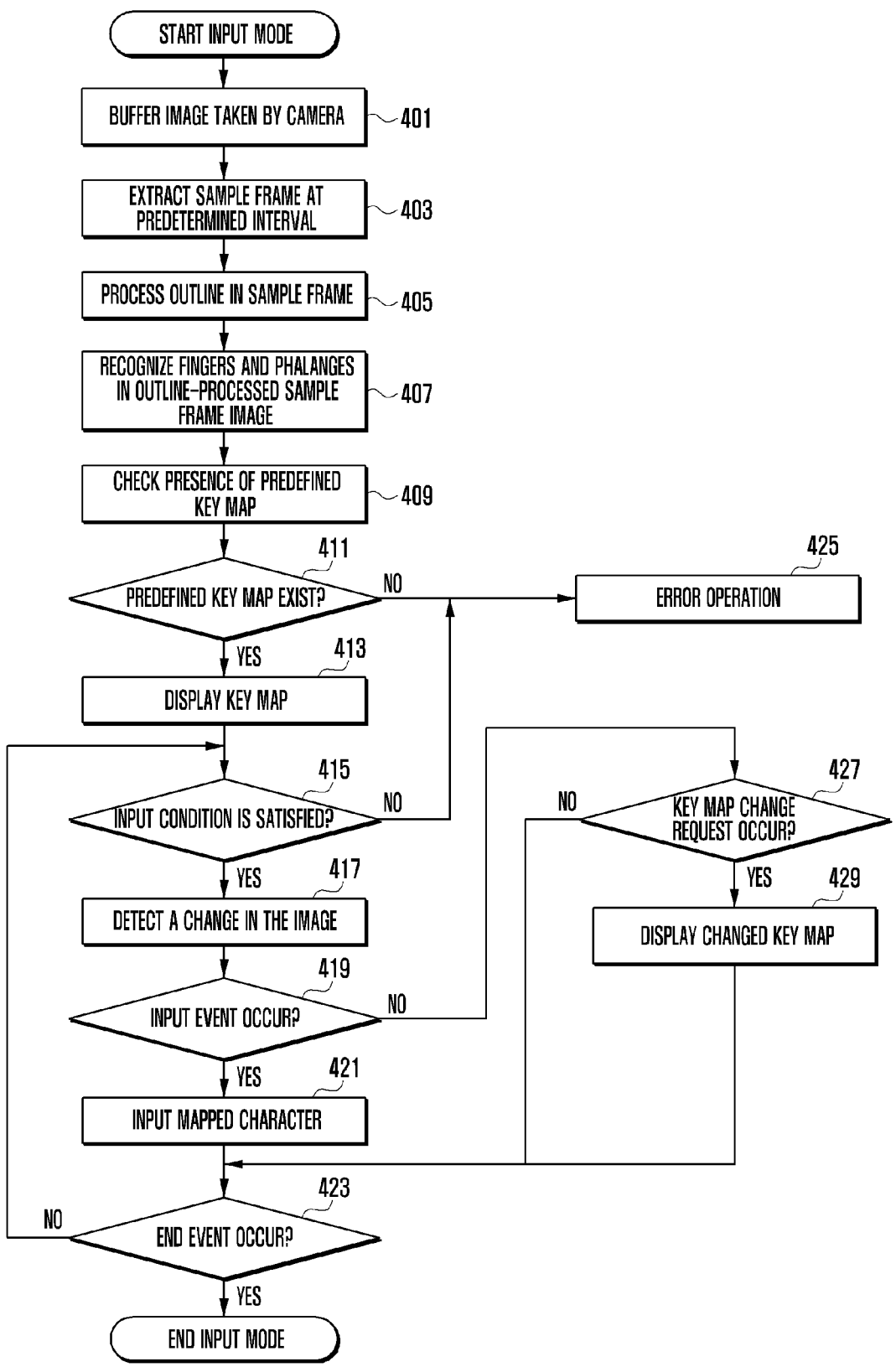
FIG. 4 is a flowchart illustrating the detail operations of the input method according to an embodiment of the present invention.

FIG. 4 is a flowchart illustrating the detail operation of the input method according to an embodiment of the present invention. For illustrative purpose, the description is made under the assumption that the portable device is operating during an input mode with the activated camera 140.

Referring to FIG. 4, the control unit 110 of the portable device according to an embodiment of the present invention controls the storage unit 120 to buffer the images (preview screen) captured by the camera 140 in a buffer (not shown) at step 401. The control unit 110 extracts the sample frames at a specific interval. For example, the interval may be set in the range of ⅟24~⅕ seconds. However, the present invention is not limited thereto.

The control unit 110 performs an outline process on the extract sample frame for recognizing the image at step 405. For this purpose, the control unit 110 may include an image processor 111. The image processor 111 of the control unit 110 extracts the outline of an object in the image captured by the camera 140 and recognizes the object based on the extracted outline using an image recognition technology. Since such an image recognition technology is well-known to those in the art of the present invention, detailed description thereon is omitted herein.

The control unit 110 recognizes the fingers and finger phalanges in the outline-processed sample frame image at step 407. For this purpose, the image processor 111 of the control unit 110 recognizes the phalanges by regarding the finger joint wrinkles as boundaries therebetween.

If the hand and the finger phalanges for each finger are recognized through steps 405 and 407, the control unit 110 checks the existence of a predefined key map at step 409 that matches a particular hand and searches for the key map corresponding to the recognized hand and finger phalanges at step 411. That is, the control unit 110 is capable of determining whether there is a predefined key map in the key-hand mapping table 121 corresponding to the currently recognized hand shape in the storage unit 120.

If the corresponding key map is not retrieved at step 411, the control unit 110 performs error operation at step 425. For example, the control unit 110 is capable of alarming the absence of the corresponding key map and displays a message requesting for a change in the hand shape. Otherwise, if the corresponding key map is retrieved, the control unit 110 controls the display unit 130 to display the retrieved key map on the screen at step 413. That is, the control unit 110 retrieves the characters mapped to the corresponding finger phalanges (or boundaries) from the key-hand mapping table 121 and presents the characters on the screen in match with the respective finger phalanges using the augmented reality technology.

The control unit 110 determines whether the input condition is satisfied at step 415. To this end, the control unit 110 is capable of checking whether the user's hand is out of the shooting range of the camera 140, whether the hand shape is changed, or whether the thumb as an input object is not recognized. If the input condition is not satisfied at step 415, the control unit 110 performs error operation at step 425 by outputting an error message. Otherwise if the input condition is satisfied at step 415, the control unit 110 detects for any change in the image at step 417. For example, the control unit 110 is capable of tracking the change of the shade or color due to the movement and press action of the thumb.

Then, the control unit 110 determines whether an input event is detected at step 419. For example, if a change in shade is detected due to a press action of the thumb to a specific phalange, the control unit 110 detects this as an input event to enter or display the character, number or symbol mapped to the pressed phalange. If an input event is detected at step 419, the control unit 110 enters the character mapped to the segment where the input event is detected at step 421. Otherwise, if no input event is detected, the control unit 110 determines whether a key map change request is detected at step 427. The key map change request can be determined depending on the change in the hand shape or specific gesture. For example, in the state that all fingers are unfolded, if the some of the fingers are folded and then unfolded or turns the hand to face the back of the hand to the camera 140 instead of the front of the hand facing the camera 140, the control unit 110 regards the gesture as the input for changing the Korean character key map to the English character key map or numeric key map.

If no key map change request is detected, the procedure goes to step 423. Whereas if the key map change event is detected, the control unit 110 changes the current key map to a new key map, and then displays the changed key map at step 429. Here, the control unit 110 responsive to the key map change request, performs the operations cited in FIG. 3 to determine a new key map.

Thereafter, the control unit 110 determines whether the character input mode termination event is detected at step 423. If no character input mode termination event is detected, the control unit 110 returns the procedure to step 415. Otherwise, if a character input mode termination event is detected, the control unit 110 terminates the character input mode.

Although FIGS. 3 and 4 are directed to the case where the key map change is triggered by a change in the hand shape or a specific gesture input, the present invention is not limited thereto. For example, the hand shape change event or specific gesture can be registered as an input gesture to perform other function (e.g. copy, delete, paste, etc.) or input a function key (e.g. shift key, control key, etc.).

FIGS. 5 to 8 are diagrams illustrating exemplary screen images displayed during the character input mode of the portable device according to the first to fourth embodiments of the present invention using an augmented reality technology.

Figure 5:
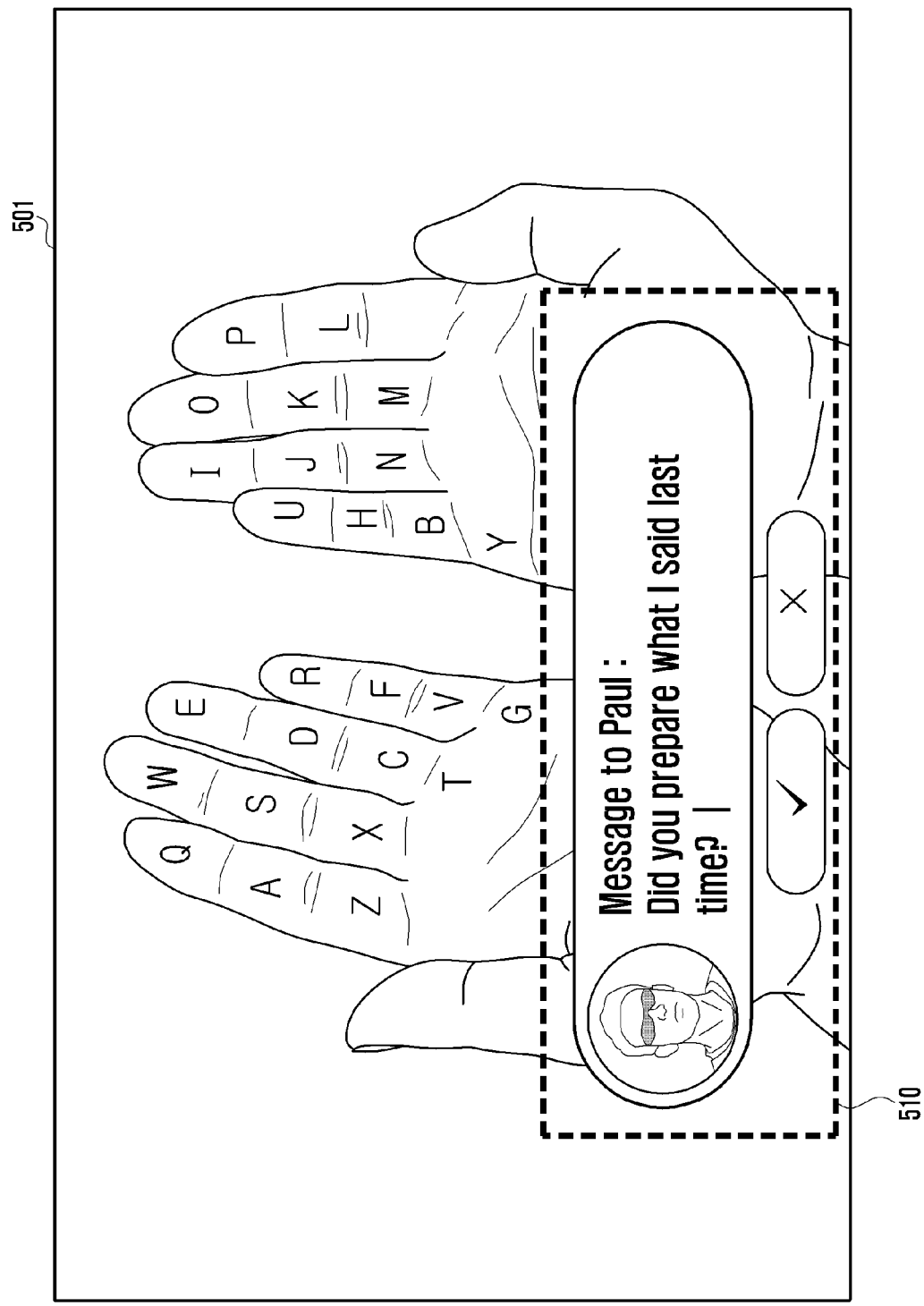
FIG. 5 is an exemplary screen image displayed during a character input mode of the portable device according to the first embodiment of the present invention.

Referring to FIGS. 5 to 8, if an input mode is activated, the display unit 130 displays a character input mode screen as shown in FIG. 5 according to the first embodiment of the present invention. Note that the character input mode includes an input of other key such as a number, a special symbol and foreign character. The character (or number or symbol) input mode screen as displayed in FIG. 5 is directed to the case where the character input method is applied to a wearable computer such as glasses-type terminal. As a user does not hold the glasses-type terminal which in turn free up the user's hand, the character keys can be mapped to the finger phalanges of the both hands except the thumbs, as shown in FIG. 5.

As shown, the character keys can be mapped to both hands as like the QWERTY keypad. The mapped hands with the alphabets (or other key characters) are then displayed so that a user can look up during a character input operation and the terminal can recognize the movement and activation by the thumbs to a specific character or number key.

In the fingers where the number of phalanges is not available for example, some keys (T, G, and Y in FIG. 5) can be mapped to predetermined parts of the respective hands as shown in FIG. 5.

In operation, both thumbs can be used as the selection means for selecting a particular key (character). That is, the user is capable of manipulating the left thumb to press or active the second phalange of the second (middle) finger of the left hand for inputting the character 'S' and the right thumb to presses or activate the first phalange of the middle finger of the right hand for inputting the character 'O'. Here, the control unit 110 is capable of processing the inputs in the temporal order of selection and enter the selected character in sequence. In the case that two phalanges are selected simultaneously, the two corresponding characters are processed in a random order or in an order determined through the auto complete function.

The character input mode screen according to the first embodiment of the present invention is capable of including a preview screen 501 taken by the camera 140 and the character input window 510 for displaying the entered characters. Here, the preview screen 501 is displayed as a full screen on which the character input window is overlaid.

Figure 6:
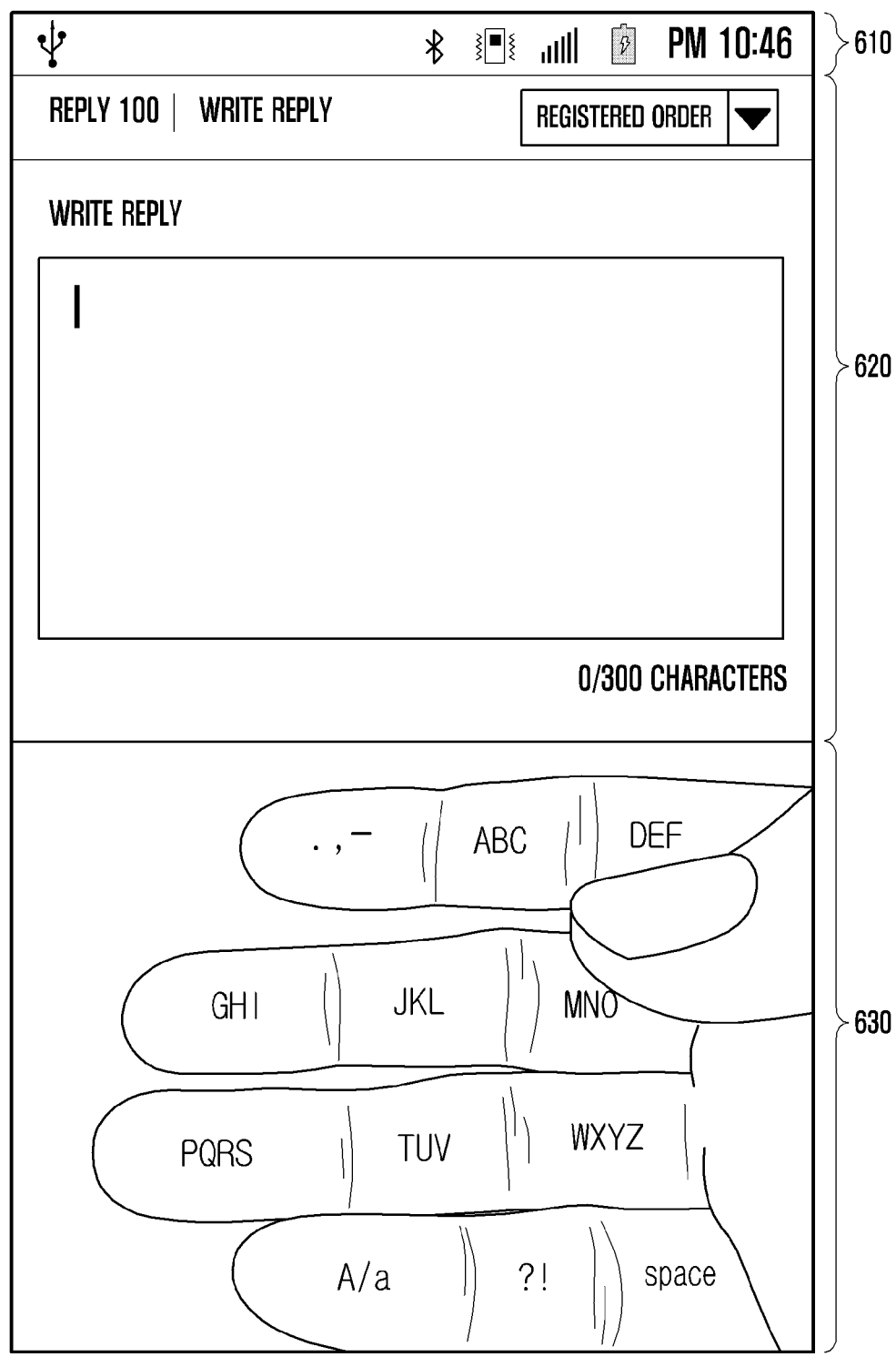
FIG. 6 is an exemplary screen image displayed during a character input mode according to the second embodiment of the present invention.
Figure 7:
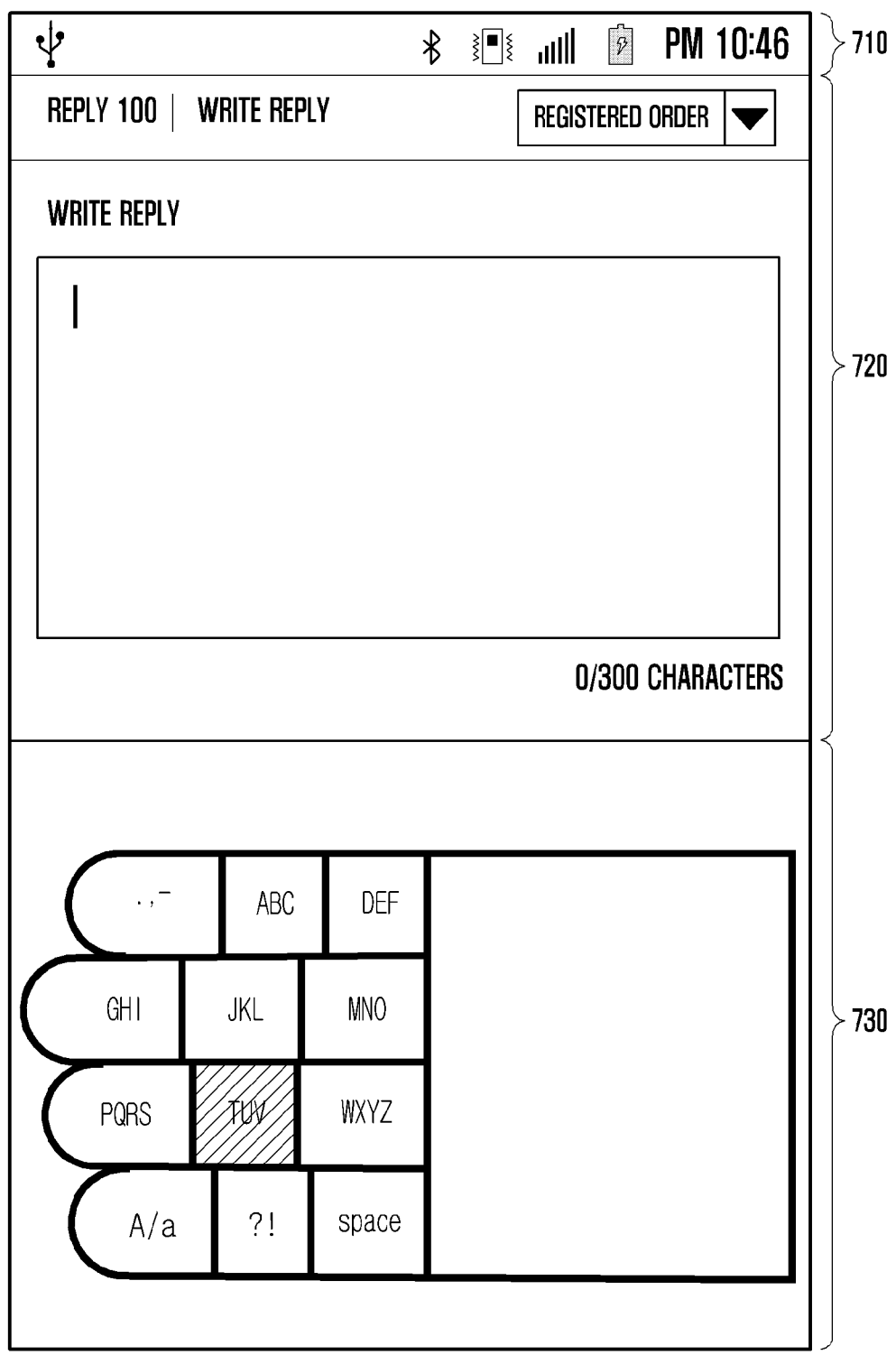
FIG. 7 is an exemplary screen image displayed during a character input mode according to the third embodiment of the present invention.
Figure 8:
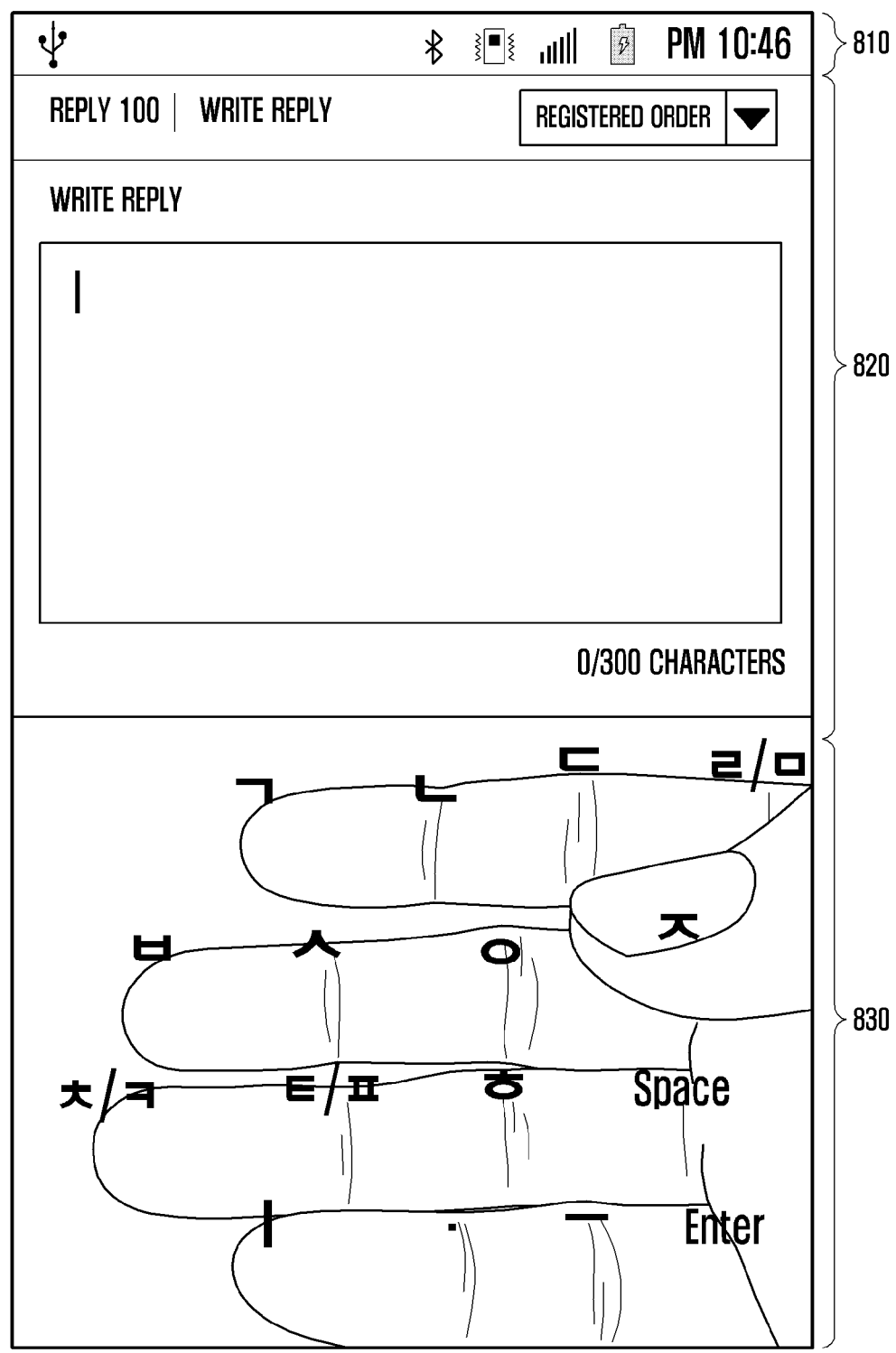
FIG. 8 is an exemplary screen image displayed during a character input mode according to the fourth embodiment of the present invention.

FIGS. 6 to 8 shows the exemplary character input mode screens applied to a portable device according to the second to fourth embodiments of the present invention. The character input mode screen according to the second embodiment of the present invention is capable of including an indication bar region 610, a character input window region 620, and a virtual keypad region 630. The indication bar region 610 may include a residual battery indicator, timer indicator, communication status indicator, vibration/sound mode setting indicator, etc. The character input window region 620 displays the character entered by the user. The virtual keypad region 630 displays an image (preview screen) taken by the camera 140. Unlike the first embodiment, the second embodiment of the present invention is directed to the case of using one hand. Accordingly, the key map is mapped to the hand in form of the key arrangement similar to that of the normal 3*4 keypad. For example, the first (distal) to third (proximal) phalanges of the first (index) finger are designated for '.,-', 'ABC' and 'DEF'; the first to third phalanges of the second (middle) finger for 'GHI', JKL', and 'MNO'; the first to third phalanges of the third (ring) finger for 'PQRS', 'TUV', and 'WXYZ'; and the first to third phalanges of the further (little) finger for 'A/a', '?!', 'Space'. Accordingly, the user is capable of manipulating the thumb to press the second phalange of the first finger for input of the character 'A' and the first phalange of the second finger twice for input of the character 'H'.

Although FIG. 6 is directed to the case of using the right hand, the present invention is not limited thereto. That is, the present invention can be applied to the case of using the left hand.

Referring to FIG. 7, the character input mode screen according to the third embodiment of the present invention includes an indication bar region 710, a character input window region 720, and the virtual keypad region 730 like that of the second embodiment. At this time, the virtual keypad region 730 of the character input mode screen according to the third embodiment of the present invention displays a virtual keypad in the form of a predetermined image or pictogram instead of the live image (preview screen) captured by the camera 140. In operation, the control unit 110 is capable of tracking the position of the thumb and highlighting the phalange closest to the thumb. In FIG. 7, it is shown that the thumb is positioned close to the second phalange of the third finger. In this state, the user is capable of input the character 'T' by manipulating the thumb to press the second phalange of the third finger one time. If a user wants to type "u", the user may activate the highlighted section "TUV" twice. In another embodiment of the present invention, the character's color, size, and background color can be changed to indicate the position of the thumb.

Referring to FIG. 8, the character input mode screen according to the fourth embodiment of the present invention is similar to the character input mode screen of the second embodiment. That is, the character input mode screen includes an indication bar region 810, a text input window region 820, and a virtual keypad region 830. The character input mode screen according to the fourth embodiment of the present invention differs from that of the second embodiment in that the characters are not mapped to the finger phalanges but finger tips and joints instead. For example, the finger tip of the first finger is designated for 'ㄱ', the first (distal interphalangeal) joint of the first finger for 'ㄴ', the second (proximal interphalangeal) joint of the first finger for 'ㄷ', and the third (metacarpophalangeal) joint of the first finger for 'ㄹ/ㅣ'. Also, the finger tip of the second finger is designated for 'ㅂ', the first (distal interphalangeal) joint of the second finger for 'ㅅ', the second (proximal interphalangeal) joint of the second finger for 'ㅇ', and the third (metacarpophalangeal) joint of the second finger for 'ㅈ'. Also, the finger tip of the third finger is designated for 'ㅊ/ㅋ', the first (distal interphalangeal) joint of the third finger for 'ㅌ/ㅍ', the second (proximal interphalangeal) joint of the third finger for 'ㅎ', and the third (metacarpophalangeal) joint of the third finger for 'Space'. Finally, the finger tip of the fourth finger is designated for 'ㅣ', the first (distal interphalangeal) joint of the fourth finger for '.', the second (proximal interphalangeal) joint of the fourth finger for '-', and the third (metacarpophalangeal) joint of the fourth finger for 'Enter'. Here, the thumb works as a selection means for selecting the character to be input and process the selection for display.

Although the descriptions have been made with reference to specific key maps as shown in FIGS. 5 to 8, the present invention is not limited thereto. That is, the phalanges and joints of the fingers can be designated for various keys (or characters) in different languages according to the designer's preference.

Figure 9:
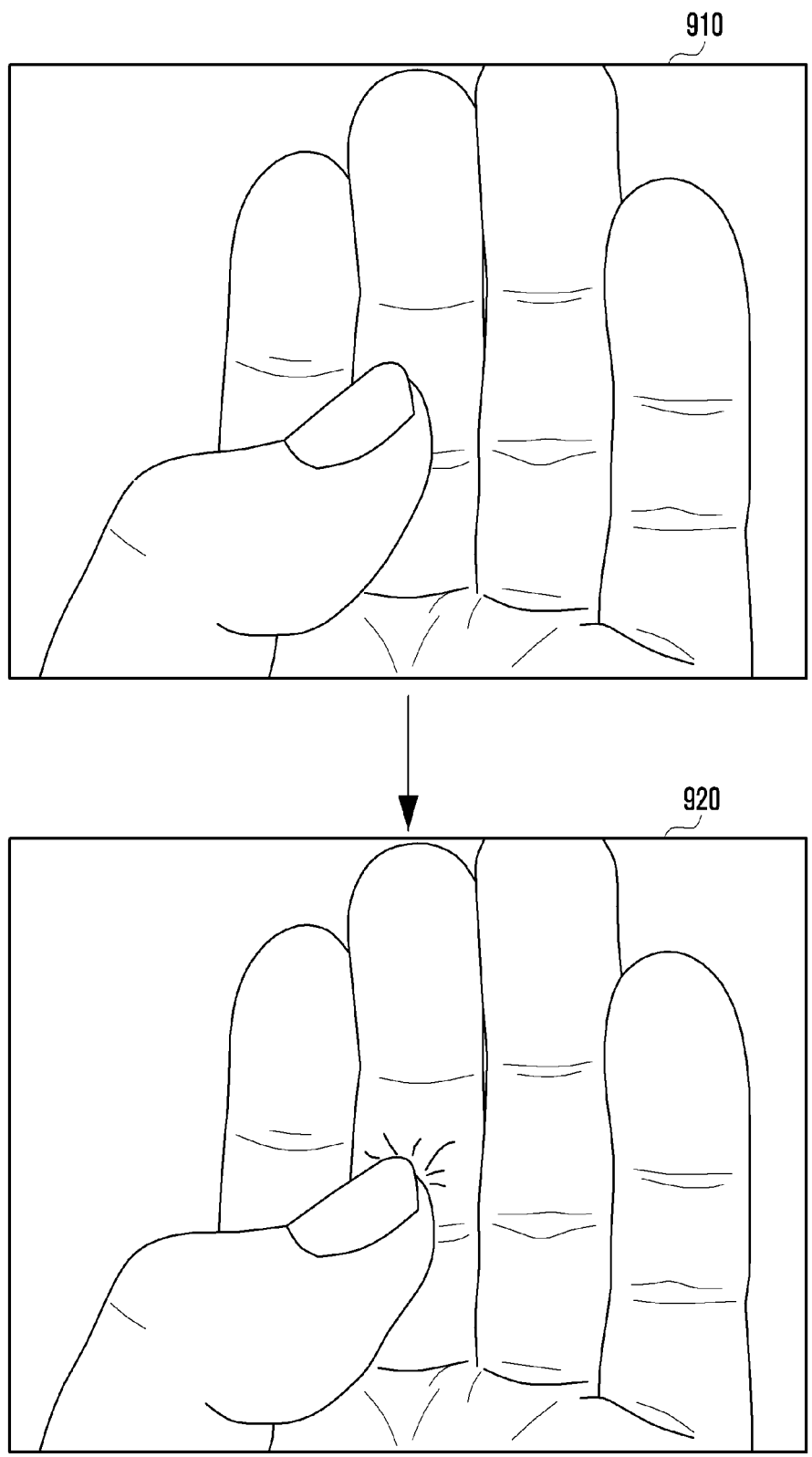
FIG. 9 illustrates exemplary screen images for explaining the key input mechanism of the input method according to an embodiment of the present invention.

FIG. 9 is a diagram illustrating exemplary screen images for explaining key input mechanism of the input method according to an embodiment of the present invention.

Referring to FIG. 9, the control unit 110 activates the camera 140 during the character input mode to take the image of the user's hand and controls the display unit 130 to display the image of the hand in the form of the preview screen as denoted by reference number 910. In this state, the control unit 110 is capable of tracking any change in the image, especially, around the finger tip of the thumb. If the user manipulates the thumb to press a specific position as shown in the screen image 920, the control unit 110 detects the changes of image (e.g. shade and color) around the corresponding position and processes the detected changed location as the input of the key (or character) mapped to the corresponding position. In order to accomplish this, the control unit 110 extracts the sample frame from the preview screen periodically and analyzes and compares the extracted sample frames.

Although the description has been directed to the case whether a key (or character) is input by manipulating the thumb to press the region where the corresponding key (or character) is mapped, the present invention can be implemented in such a way of tracking the movement of the thumb to input the corresponding character as in the Swype character input method, rather than recognizing the shade change caused by the press action of the thumb. For example, the control unit 110 may track the motion of the thumb to input, when the movement direction of the thumb is changed or the thumb stays at a certain position over predetermined time duration, the character at the position where such event has occurred.

Further, although the description has been directed to the exemplary case whether the thumb is used as an input means, the present invention is not limited thereto. That is, the present invention can be implemented with various input objects. For example, in the case of using one hand (left hand), it is possible to user one of the fingers of the other hand (right hand) as the input means. Also, the present invention can be implemented with the use of one of pen, stylus, and stick as the key input means.

Figure 10:
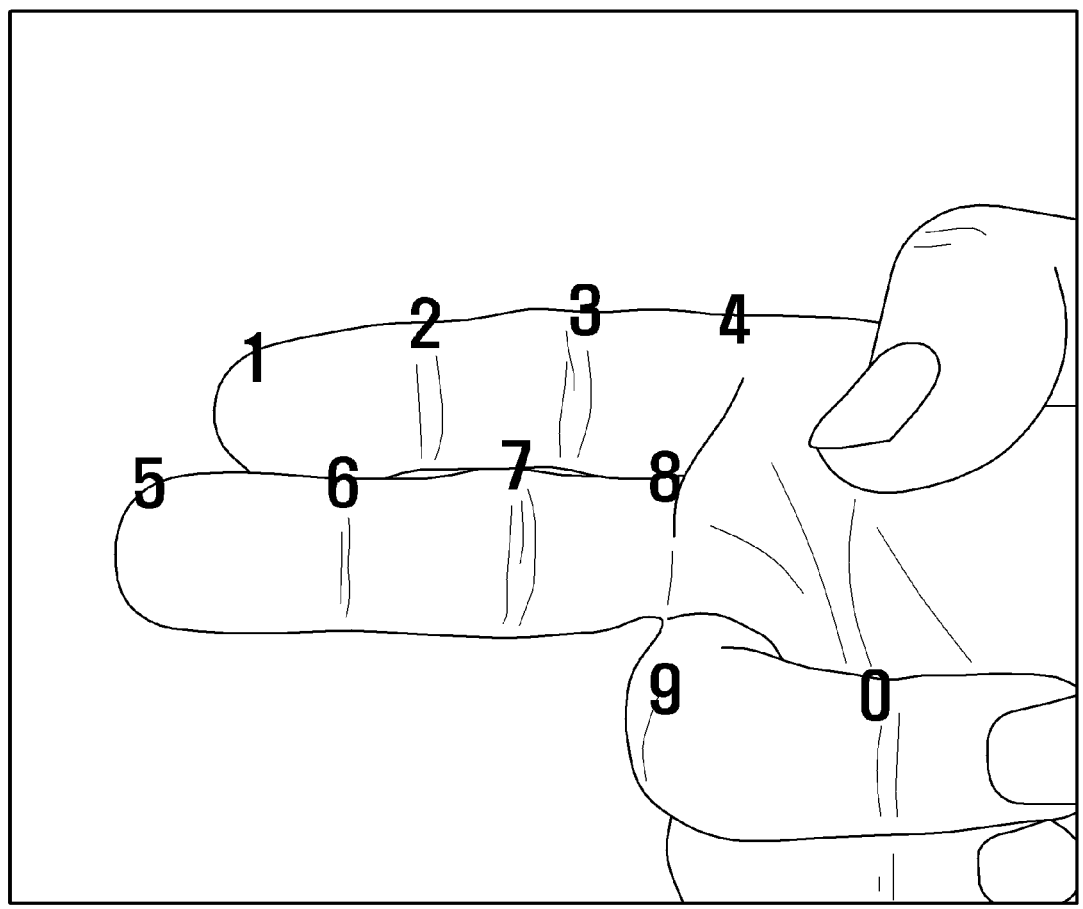
FIG. 10 is an exemplary screen image for explaining the key input mechanism of the input method according to another embodiment of the present invention.

FIG. 10 is a diagram illustrating an exemplary screen image for explaining key input mechanism of the input method according to another embodiment of the present invention.

According to an embodiment of the present invention, from a state that all the fingers of the right hand are unfolded, if the user folds the third and fourth fingers as shown in FIG. 10, the control unit 110 controls to display a numeric key map from a character key map. That is, the control unit 110 is capable of switching among the key maps according to a change in the hand shape of the user. For example, the control unit 110 may control to present the Korean character key map or English character key map in response to the gesture of unfolding all the fingers and then the numeric key map in response to the gesture of folding the third and fourth fingers or at least one finger.

Accordingly, the key maps can be switched according to a number of predetermined gesture or combination thereof. For example, the control unit 110 is capable of controlling to switch the Korean character key map to the English character key map and then the numeric key map in response to the gesture of folding and unfolding the fingers, or turning the hand such that the back of the hand faces the camera 140.

Alternatively, the Korean character key map, English small character key map, English capital character key map, and numeric key map are mapped to the respective gestures such that when one of the gestures is detected, the corresponding key map is displayed on the screen of the display unit 130.

Although the description has been directed to the exemplary case of using the user's hand, the present invention is not limited thereto. For example, the present invention can be implemented with the glove-worn hand by differentiating among the segments delimited by wrinkles formed on the surface of the glove.

As described above, the input apparatus and method of the portable device according to the present invention is capable of facilitating character input in such a way of taking a picture of the user hand(s) by means of an embedded camera and tracking the motion of the fingers to detect a character input gesture for entering a desired input from the displayed key map.

Also, the input apparatus and method of the portable device according to the present invention is capable of inputting characters and/or commands efficiently without extra input means such as keypad, touchscreen, and keyboard, and thus it is advantageous and economical to apply to a small device constrained with the input device-mounting space and improve user convenience.

The above-described input method of a portable device according to an embodiment of the present invention can be implemented in the form of computer-executable program commands and stored in a computer-readable storage medium. The computer readable storage medium may store the program commands, data files, and data structures in individual or combined forms. The program commands recorded in the storage medium may be designed and implemented for various exemplary embodiments of the present invention or used by those skilled in the computer software field. The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various exemplary embodiments of the present invention.

Although the input apparatuses and methods of a portable device according exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. An input apparatus for use in a portable device, comprising:
   a camera for capturing an image of a hand;
   a storage unit which stores a key-hand mapping table for mapping segments of a hand to a plurality of keys, respectively, according to predetermined criteria;
   a display unit which displays, in an input mode, the captured image thereon; and a control unit configured to:
  activate the camera during the input mode and control the display unit to display the captured image,
  display the plurality of keys mapped to the segments of the hand based on the key-hand mapping table, in response to detecting that a shape of the hand satisfies a predetermined condition,
  output a message requesting a change of the shape of the hand, in response to detecting that the shape of the hand does not satisfy the predetermined condition,
  in response to detecting an image change in one of the segments displayed on the display unit, input a key of the plurality of keys mapped to the segment where the image change is detected on the display unit, and
  in response to detecting, via the camera a particular change in the hand folding at least one finger while other fingers are extended, removing the displayed plurality of keys to display a numeric keypad mapped to at least some of the segments of the hand based on the key-hand mapping table.
  wherein the control unit controls the display unit to display a character input region displaying one or more characters inputted via the mapped plurality of keys, the character input region displayed separately from the mapped plurality of keys.

2. The apparatus of claim 1, wherein the control unit controls the display unit to display a specific key map including the plural keys mapped to the segments of the hand over the captured image.

3. The apparatus of claim 2, wherein the control unit controls the display unit to display a pictogram corresponding to the specific key map.

4. The apparatus of claim 3, wherein the control unit controls the display unit to highlight the segment pointed by a thumb of the hand.

5. The apparatus of claim 1, wherein the control unit controls the display unit to display the image captured during the input mode on a full screen and display a character input window on the full screen for displaying the key input.

6. The apparatus of claim 1, wherein the control unit tracks a movement of an input object and processes a change in the image caused by the input object as the key input.

7. The apparatus of claim 1, wherein the control unit recognizes the shape of the hand and performs one of switching from a first key map to a second key map, executing a specific function, and inputting a specific key according to the shape of the hand.

8. The apparatus of claim 1, wherein the control unit detects a hand gesture and performs one of switching from a first key map to a second key map, executing a specific function, and inputting a specific key according to the detected hand gesture.

9. The apparatus of claim 1, wherein the segments are defined by finger phalanges, finger tips, and finger joints.

10. The apparatus of claim 1, wherein the key-hand mapping table comprises at least one of key maps for left and right hands.

11. An input method for use in a portable device, the method comprising:
  activating a camera during an input mode and displaying an image captured by the camera on a screen;
  determining whether a hand is recognized from the image;
  assigning a plurality of keys to segments of the hand based on predetermined criteria, in response to detecting that a shape of the hand satisfies a predetermined condition;
  outputting a message requesting a change of the shape of the hand, in response to detecting that the shape of the hand does not satisfy the predetermined condition; and
  detecting an image change in one of the segments and inputting the key mapped to the segment at which the image change is detected; and
  in response to detecting, via the camera, a particular change in the hand folding at least one finger while other fingers are extended, removing the assigned plurality of keys to display a numeric keypad mapped to at least some of the segments of the hand based on the predetermined criteria,
  wherein a character input region displaying one or more characters inputted via the assigned plurality of keys is displayed separately from the assigned plurality of keys on the screen.

12. The method of claim 11, further comprising displaying a specific key map including the plurality of keys mapped to the segments of the hand over the captured image.

13. The method of claim 12, wherein displaying comprises displaying a pictogram corresponding to the specific key map.

14. The method of claim 11, wherein inputting the key comprises:
  tracking a movement of an input object; and
  processing a change in the image caused by the input object as the key input.

15. The method of claim 14, further comprising highlighting the segment pointed by a thumb of the hand.

16. The method of claim 11, further comprising:
  recognizing the shape of the hand or a hand gesture; and
  performing one of switching from a first key map to a second key map, executing a specific function, and inputting a specific key according to the shape of the hand or the hand gesture.

17. The method of claim 11, wherein the segments are defined by finger phalanges, finger tips, and finger joints.

18. The method of claim 11, wherein the plurality of keys is assigned to segments of the hand based on a key-hand mapping table comprising at least one of key maps for left and right hands.

19. An input method of a portable device, the method comprising:
  capturing an image during an input mode;
  recognizing a hand and segments of the hand of the captured image;
  mapping keys to the segments, in response to detecting that a shape of the hand satisfies a predetermined condition;
  outputting a message requesting a change of the shape of the hand, in response to detecting that the shape of the hand does not satisfy the predetermined condition;
  detecting an input of a key mapped to the segment via an input object, the input of the key being activated in response to a change in the image at a particular segment pointed by the input object; and
  in response to detecting a particular change in the folding at least one finger while other fingers are extended, removing the mapped keys from display to display a numeric keypad mapped to at least some of the segments tithe hand, wherein a character input region displaying the input of the key inputted via the mapped keys is displayed separately from the mapped keys.

20. A non-transitory computer-readable storage medium storing one or more programs comprising instructions which, when executed by an electronic device, cause the electronic device to execute the method according to claim 11.

21. A non-transitory computer-readable storage medium storing one or more programs comprising instructions which, when executed by an electronic device, cause the electronic device to execute the method according to claim 19.

22. The input apparatus of claim 1, the control unit further configured to:
in response to detecting, via the camera, unfolding of the folded at least one finger, removing the numeric keypad from display to redisplay the mapped plurality of keys.

23. The input method of claim 11, further comprising:
in response to detecting, via the camera, unfolding of the folded at least one finger, removing the numeric keypad from display to redisplay the assigned plurality of keys.

24. The input method of claim 19, further comprising:
in response to detecting unfolding of the folded at least one finger, removing the numeric keypad from display to redisplay the mapped keys.

* * * * *